United States Patent [19]

Snyder et al.

[11] Patent Number: 5,564,109
[45] Date of Patent: Oct. 8, 1996

[54] REMOTE USER INTERFACE FOR PRIORITIZING AND SELECTING FROM A PLURALITY OF DOCUMENT PRODUCTION PERIPHERAL DEVICES

[75] Inventors: Valerie J. Snyder, Rochester; Milton S. Sales, Webster, both of N.Y.

[73] Assignee: Eastman Kodak Company, Rochester, N.Y.

[21] Appl. No.: 184,893

[22] Filed: Jan. 21, 1994

Related U.S. Application Data

[63] Continuation of Ser. No. 759,344, Sep. 13, 1991, abandoned.

[51] Int. Cl.⁶ ............................. G06F 3/12; G03G 15/00
[52] U.S. Cl. ...................... 395/828; 395/836; 395/200.1; 395/284; 355/202; 355/204; 364/DIG. 1; 364/235; 364/237.9; 364/242.95
[58] Field of Search ..................................... 395/109; 112, 395/114, 200.1, 200.11, 828, 835, 836, 287, 800; 355/202, 204

[56] References Cited

U.S. PATENT DOCUMENTS

| | | | |
|---|---|---|---|
| 4,167,322 | 9/1979 | Yano et al. | 364/140 |
| 4,476,486 | 9/1984 | Ayata et al. | 358/78 |
| 4,494,862 | 1/1985 | Tanaka | 355/14 |
| 4,497,037 | 1/1985 | Kato et al. | 355/202 |
| 4,527,885 | 7/1985 | Ayata et al. | 347/2 |
| 4,754,428 | 6/1988 | Schultz et al. | 395/200.18 |
| 4,797,706 | 1/1989 | Sugishima et al. | 358/300 |
| 4,839,829 | 6/1989 | Freedman | 364/519 |
| 4,839,885 | 6/1989 | Wu | 370/85.1 |
| 4,899,291 | 2/1990 | Tsukada et al. | 355/202 |
| 4,970,554 | 11/1990 | Rourke | 355/202 |
| 5,038,273 | 8/1991 | Ito et al. | 355/204 |
| 5,045,880 | 9/1991 | Evanitsky et al. | 355/200 |
| 5,047,957 | 9/1991 | Ikenoue et al. | 364/519 |
| 5,128,878 | 7/1992 | Gore et al. | 395/162 |
| 5,179,637 | 1/1993 | Nardozzi | 395/114 |
| 5,200,674 | 6/1993 | Morgan et al. | 395/800 |

FOREIGN PATENT DOCUMENTS 0182770  1/1991  Japan.

OTHER PUBLICATIONS

Classified Search and Image Retrieval Student Manual for the Automated Patent System (APS), U.S. Dept. of Commerce, U.S. Patent and Trademark Office, pp. 5–9 to 5–11, May 7, 1991.

Waite Goup, "PC Lan Primer", 1986, pp. 6–7.

Primary Examiner—Lance Leonard Barry
Attorney, Agent, or Firm—Lawrence Kessler

[57] ABSTRACT

An operator at a remote user interface can receive a directory of available peripheral devices, together with a disclosure of the current configuration of setup parameters of each device so that the operator can select the peripheral device best suited for a particular job. The directory may provide a ranking of the peripheral devices according to fit with the selected setup parameters and a predetermined ordering of the importance of each parameter. The directory may be limited to only those document production apparatus which are capable of being configured in accordance with the operator's selection of setup parameters; or the directory may include all document production apparatus on the network, letting the operator modify the parameter selection to fit the available configurations if necessary.

9 Claims, 3 Drawing Sheets

REMOTE USER INTERFACE FOR PRIORITIZING AND SELECTING FROM A PLURALITY OF DOCUMENT PRODUCTION PERIPHERAL DEVICES

This is a Continuation of application Ser. No. 07/759,344, filed 13 Sep. 1991 now abandoned.

BACKGROUND OF THE INVENTION

1. Technical Field

This invention relates generally to selection from a plurality of a document production apparatus such as copiers and printers.

2. Background Art

Local area networks have been provided to allow user interfaces such as work station terminals to be connected to a plurality of peripheral devices, such as copiers and printers (herein collectively referred to as "document production apparatus") to allow more than one network user to share the devices.

Modern copiers and printers, such as those having electrostatographic marking engines, may be configured for a particular job by the operator selecting from available setup parameters. The variable setup parameters which are available differ from marking engine to marking engine, and may include both job-level features and page-level features. Such features may include collation mode, accent color, image processing, image reversal, center shift, reduction/enlargement, paper supply selection, blanking, framing, image shift, collation, simplex/duplex, image combine, highlighting, lead edge erase, etc.

The selection process generally does not take much time, as most users find that the default parameter settings are usually desired, with possibly only a few changes to be made. Some jobs, however, require substantial operator input and time to configure the document production apparatus as desired. These time consuming entries will tie-up the document production apparatus while the operator make his or her selections on an integral user interface such as an operator control panel.

Systems are known wherein the operator can make setup parameter selections off-line at a remote user interface, freeing the document production apparatus for use by others while the selections are being made. Once made, the setup parameter selections are communicated to the document production apparatus by portable memory (magnetic disc or card, keysheet, etc.) or by direct communication (local area network or hard wire).

Many local area networks have more than one document production apparatus available for use, some of which may be better suited than others to run a particular job, either because of availability or because of the present configuration of setup parameters. That is, one document production apparatus may already be configured according to (or close to) the setup parameters desired. It would be very useful for the operator to be provided with a list of available document production apparatus, together with their configurations of setup parameters.

DISCLOSURE OF INVENTION

According to a feature of the present invention, an operator at a remote user interface can receive a directory of available peripheral devices, together with a disclosure of the current configuration of setup parameters of each device so that the operator can select the best suitable peripheral device.

According to another feature of the present invention, the directory may provide an indication, ranking the peripheral devices according to fit with the selected setup parameters and a predetermined ordering of the importance of each parameter.

According to yet another feature of the present invention, the directory may be limited to only those document production apparatus which are capable of being configured in accordance with the operator's selection of setup parameters.

According to still another feature of the present invention, the directory may include all document production apparatus on the network; letting the operator modify the parameter selection to fit the available configurations if necessary.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Figure 1:
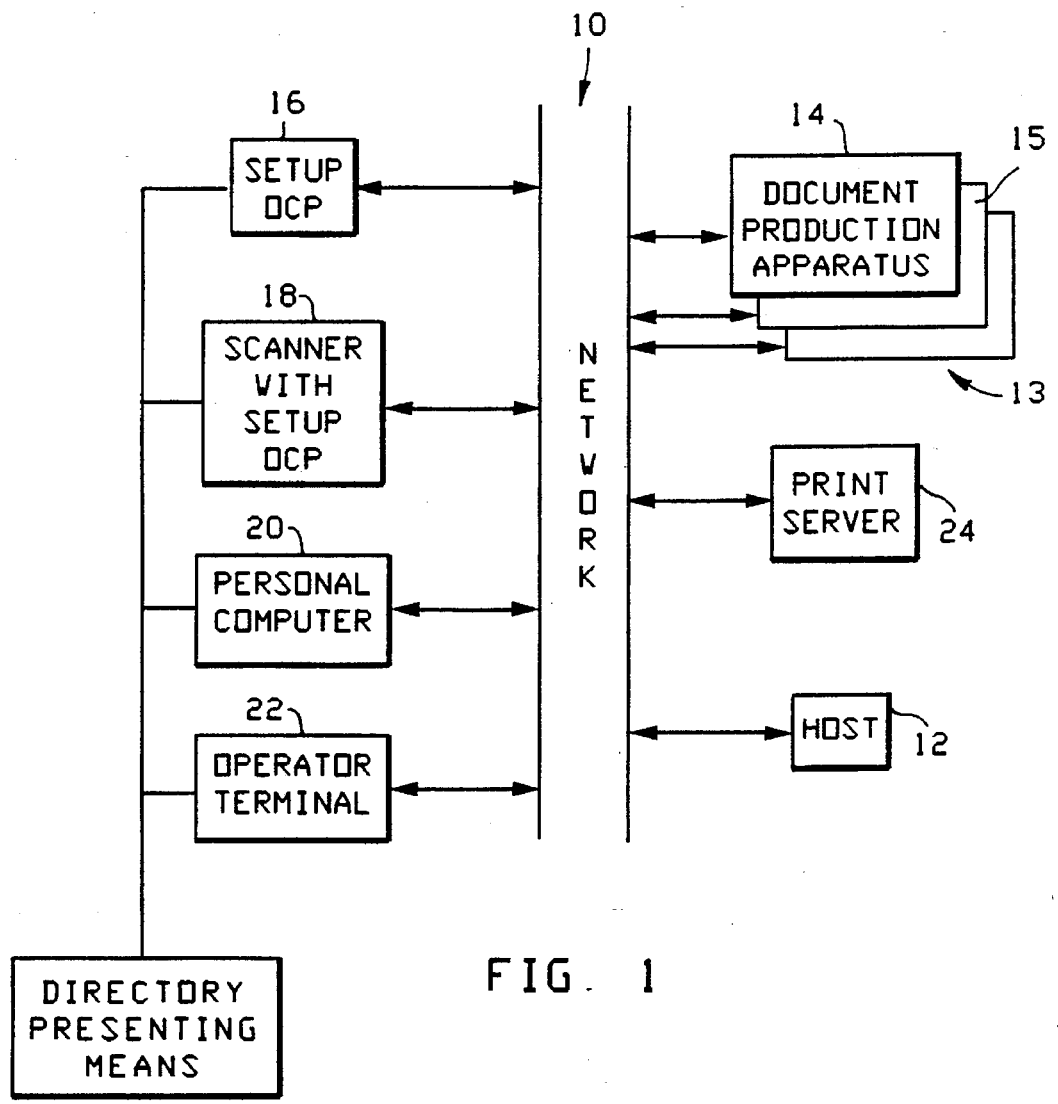
FIG. 1 is a schematic view of a preferred embodiment of a system in which the present invention is useful is shown.

Referring to the drawings, local area networks such as shown at reference numeral 10, which were first used to solve the terminal to host computer 12 connectivity problem, have evolved to allow a network user to select from more than one peripheral device 13 such as document production apparatus 14 and 15. Shared peripheral devices may be connected to a central control such as a mini or host computer; or distributed control of the peripheral devices may be provided from multiple micro, mini, or host computers across the network. These methods are well known, and provide a common interface to allow users to direct document production jobs to the network document production apparatus.

Operators at a remote user interface (such as operator control panel 16, document scanner with setup panel 18, personal computer 20, or other terminal generically represented at 22) may generate a document package or job. Each document package consists of the preferred document production apparatus configuration required; and may also include document content information (text, images, graphics, composition, fonts, and styles), if appropriate, as well as job priority information if any. Such information may be stated explicitly or embedded in the content of the job.

It is to be understood the the document package may contain only the selection of variable setup parameters, including both page-level and job-level features, and a job identification code. Document content information may be derived by the peripheral device by scanning original hard copies, by down loading from portable memory, or otherwise.

Operators are able to examine a displayed directory of available document production apparatus at the user interface. The directory includes one or more of the following information for the document production apparatus: location, queue status, a listing of available setup parameters for each document production apparatus, and the present configuration of each document production apparatus. From this display, a user is able to select the document production apparatus which best suits the requirements of the job. According to a feature of the present invention, the directory may be limited to only those document production apparatus which are capable of being configured in accordance with the operator's selection of setup parameters. Alternatively, the directory may include all document production apparatus on the network; letting the operator modify the parameter selection to fit the available configurations if necessary.

Once a document production apparatus is selected, the user sends, or takes, the job to the selected apparatus. This could entail electronic transfer of the image and job control data via the network, saving some or all of the data to portable memory for physical transport to the selected apparatus, taking hard copy originals to a selected copier apparatus for reproduction, or any other manner in which operators access document control apparatus.

The system software may be broken into three portions: (1) the communications between a remote host and a central print server 24, (2) the user interface subsystem, and (3) the actual document production apparatus management subsystem. An operator who is logged-on to a remote host can access the network print service via the communications software. The communications software makes the user's terminal appear as if the user were running the print service directly on the print server. The user is presented with the network print service user interface, which is a menu driven system.

The user interface software is a menu driven subsystem that checks a user directory service file for a list of the document production apparatus to which the user has access. A default printer, to which the user's jobs will be queued unless the user specifies otherwise, may be identified.

After the user directory service file has been queried, the user is presented with a directory of all accessible network document production apparatus containing for each such apparatus, the name, location, number of jobs queued, and current configuration of setup parameters. This can be on a single or multiple screens through which the user can page forwards and backwards.

As previously mentioned, the directory may be limited to only those document production apparatus which are capable of being configured in accordance with the operator's selection of setup parameters. Alternatively, the directory may include all document production apparatus on the network; letting the operator modify the parameter selection to fit the available configurations if necessary. The document production apparatus may be ranked on the displayed directory according to fit with the selected setup parameters and a predetermined ordering of the importance of each parameter.

Once a selection is made, and the user elects to produce a job, only the document package and the apparatus it is to be produced on must be specified. The communications software then effects a file transfer from the remote host to the print server.

Figure 2A:
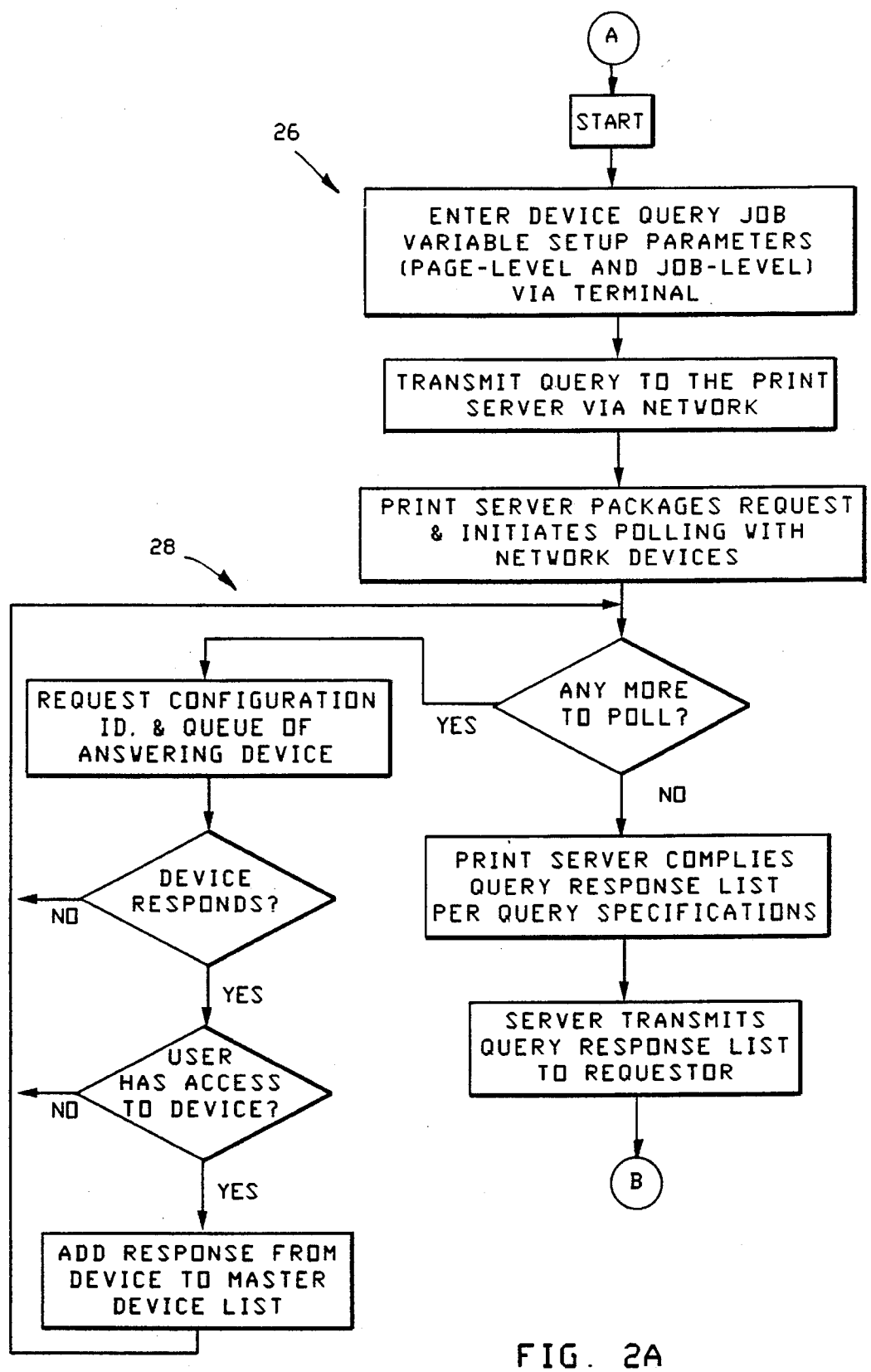
FIGS. 2A and 2B are respective parts of a logic flow chart according to a preferred embodiment of the present invention.
Figure 2B:
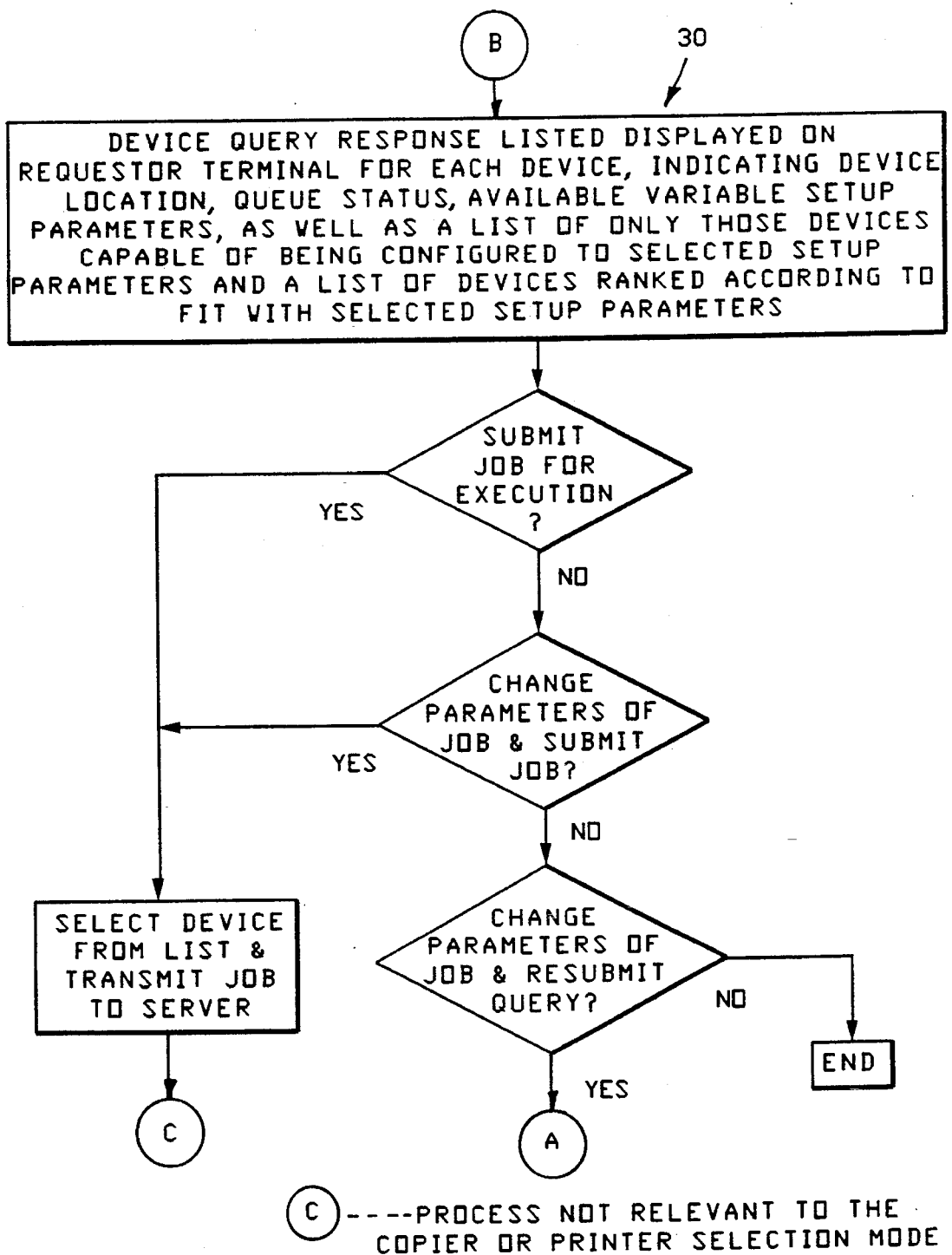

With reference to FIGS. 2A and 2B, the logic blocks represented in area 26 denote a user setting up various job parameters for the device query via one of the user interfaces shown in FIG. 1. The setup may include features of the job itself, or may be a request for a list of all devices on the network, together with their configurations (present and/or possible) and current queue status.

Alternatively, the user may request a prioritized list of devices in the network with the top device on the list being the best suited for processing the requested job, and the last being the least well suited of the devices polled. The user may request a list of only those devices whose setup will allow the execution of the requested job.

The logic blocks in area 28 denote the operation of the device after receiving such a query. The device acting as the print server will poll each marking engine device on the network for current status, configuration, and queue information. All devices that can respond (i.e., those that are functioning normally) will respond with their device identification, their current configuration, and their outstanding job queues, if any.

At the completion of each device poll, the server will add the response from that device to a master query response list of devices. At the conclusion of the polling cycle, the server will create a query response device list by comparing the features of each device with the parameters specified in the device query. The list will be comprised of those devices that satisfy the requirements of the device query. This query response list of active devices, their configurations, and accompanying queue information is then transmitted back to the user for display on the user's terminal.

The logic blocks in area 30 denote the review of the query response list by the user. At this point, the user may choose to either (a) select a device and submit the job, (b) reset the job parameters based on the results of the device query, or (3) cancel the request.

Although this description is directed principally to document production apparatus to which a print file is directly sent via the network, the present invention is equally applicable for choosing a copier or printer wherein the entire document package or a portion thereof is transferred to the document production apparatus by way of portable memory. Other portions of the document package may be brought to a chosen document production apparatus, say, in the form of a set of original hard copy documents to be reproduced.

The invention has been described in detail with particular reference to preferred embodiments thereof, but it will be understood that variations and modifications can be effected within the spirit and scope of the invention.

What is claimed is:

1. Document production apparatus comprising:

a plurality of peripheral devices, capable of producing documents, said peripheral devices respectively having a plurality of selectable peripheral device setup parameters and a plurality of selectable document production job setup parameters, means for configuring said plurality of peripheral devices by selection of certain peripheral device setup parameters from said plurality of peripheral device setup parameters, and means for setting up a document production job by selection of certain job setup parameters from said plurality of document production job setup parameters;

a user interface remote from at least some of said plurality of peripheral devices, said user interface having means for receiving said selection of said job setup parameters for a document production job;

a network interconnecting said plurality of peripheral devices and said user interface;

means, connected to said user interface, for presenting to said user interface a directory of the respective selected configurations of said plurality of peripheral devices, prioritized according to the suitability of said peripheral devices for processing the document production job set up by said document production job set up means;

means, connected to said user interface, for selecting of one of said plurality of peripheral devices of a desired configuration from said directory; and means, responsive to said last-mentioned selecting means, for sending said set up document production job to said selected peripheral device.

2. Apparatus as set forth in claim 1, wherein said plurality of peripheral devices include document copiers.

3. Apparatus as set forth in claim 1, wherein said plurality of peripheral devices include printers.

4. Apparatus as set forth in claim 1, wherein said plurality of peripheral devices include electrostatographic marking engines.

5. Apparatus as set forth in claim 1, wherein said network is a wired local area network.

6. Apparatus as set forth in claim 1 wherein said plurality of directory includes the location of said peripheral devices.

7. Apparatus as set forth in claim 1 wherein said directory includes a queue status of said plurality of peripheral devices.

8. Apparatus as set forth in claim 1 wherein said directory includes a listing of available peripheral device setup parameters for each of said plurality of peripheral devices.

9. Apparatus as set forth in claim 1 wherein said directory includes a listing of only those peripheral devices which are capable of being configured in accordance with the selected job setup parameters.

* * * * *

UNITED STATES PATENT AND TRADEMARK OFFICE
CERTIFICATE OF CORRECTION

PATENT NO. : 5,564,109
DATED : October 8, 1996
INVENTOR(S) : Valerie J. Snyder, et. al.

It is certified that error appears in the above-indentified patent and that said Letters Patent is hereby corrected as shown below:

Column 6, lines 3 and 4   Delete "plurality of" after "said".
Column 6, line 4          Insert --plurality of-- after "said".

Signed and Sealed this

Twenty-ninth Day of July, 1997

Attest:

BRUCE LEHMAN

Attesting Officer          Commissioner of Patents and Trademarks